Oct. 10, 1939.  J. SIVERTSEN  2,176,016
METHOD OF AND APPARATUS FOR MEASURING AND INDICATING OR
AUTOMATICALLY RECORDING SMALL DISTANCES
Filed Feb. 5, 1935  3 Sheets-Sheet 1
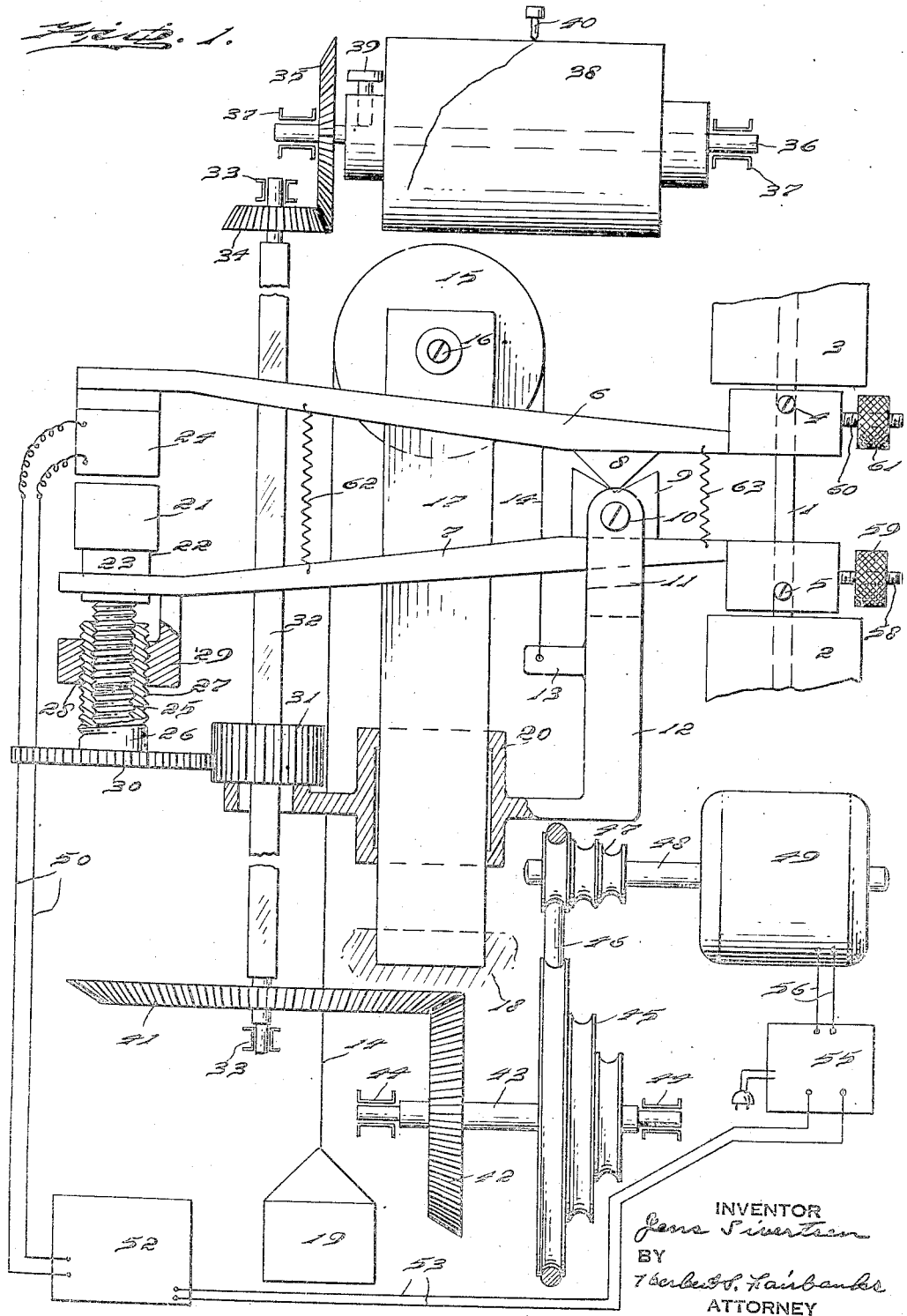
INVENTOR
Jens Sivertsen
BY
Herbert S. Fairbanks
ATTORNEY

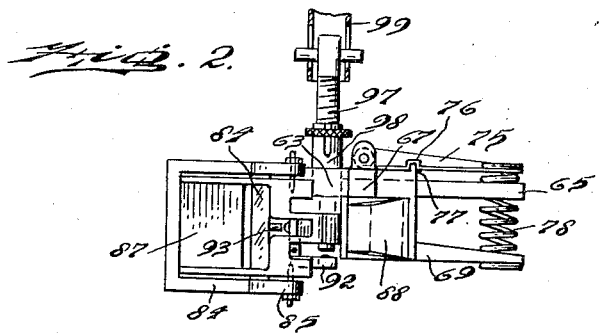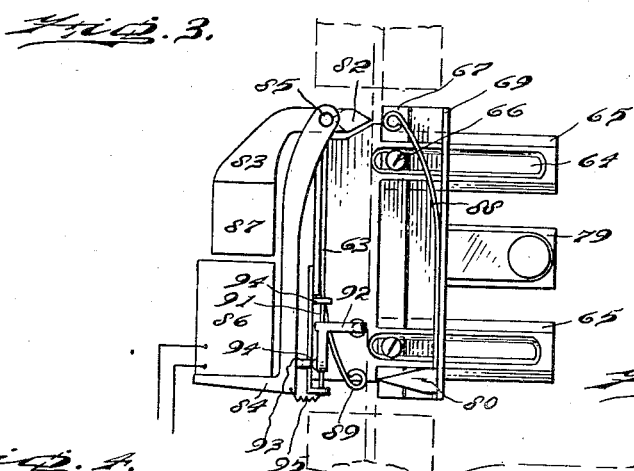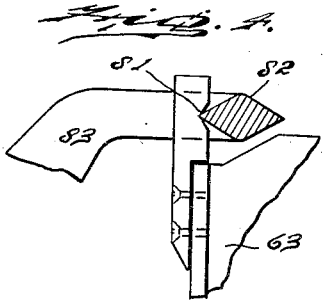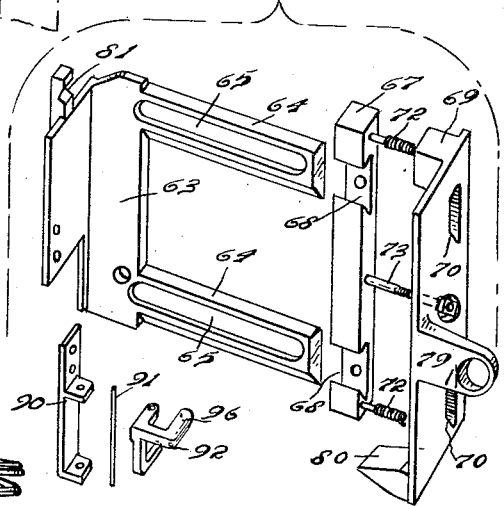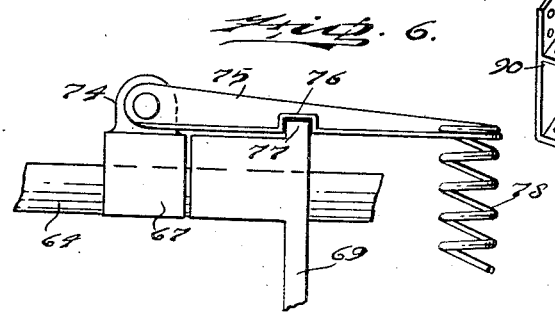

Oct. 10, 1939.  J. SIVERTSEN  2,176,016
METHOD OF AND APPARATUS FOR MEASURING AND INDICATING OR
AUTOMATICALLY RECORDING SMALL DISTANCES
Filed Feb. 5, 1935  3 Sheets-Sheet 3
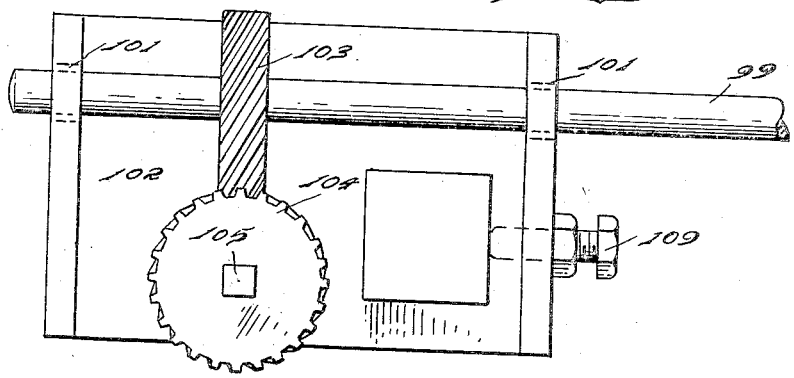
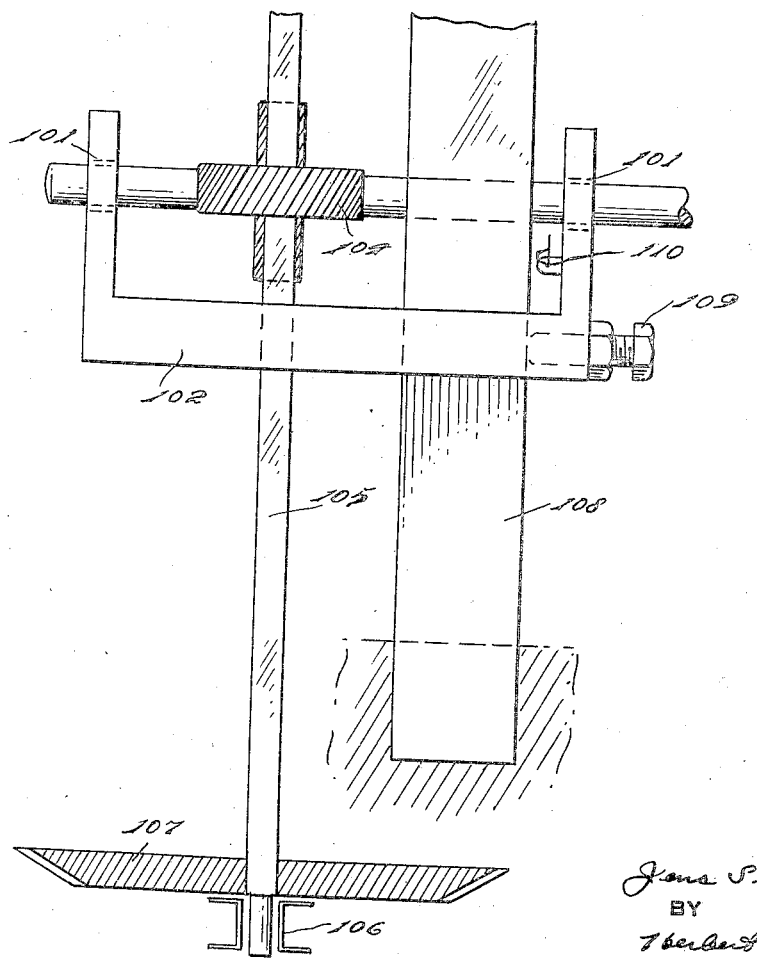

Patented Oct. 10, 1939

2,176,016

UNITED STATES PATENT OFFICE 2,176,016

METHOD OF AND APPARATUS FOR MEASURING AND INDICATING OR AUTOMATICALLY RECORDING SMALL DISTANCES

Jens Sivertsen, Philadelphia, Pa., assignor to Tinius Olsen Testing Machine Company, Philadelphia, Pa., a corporation of Pennsylvania Application February 5, 1935, Serial No. 5,056

7 Claims. (Cl. 265—2)

The object of my invention is to devise a novel method of and apparatus for accurately measuring and recording small distances, which, although not limited to such use, is particularly adapted to measure and record the elongation and compression to which specimens under test are subjected.

An analysis of the problems involved will give a clear description of the objects in view.

The apparatus may be considered as comprising the following coordinated groups:

1. A pick up system comprising means to translate a small change in distance into an electric voltage, or an unbalance in an electric network.

2. A vacuum tube amplifier to amplify the voltage of the pick up system in such a manner that the output voltage from the amplifier is approximately proportional to the input voltage.

3. An output system consisting of thermionic valves, which may be vacuum tubes or thyratrons, and a motor arrangement. The output from the amplifier controls the thermionic valves.

The thermionic valves control:

a. The direction of rotation of the motor.
b. The speed of the motor.
c. The moment of torque, and thereby
d. The acceleration and retardation of the motor.

4. Mechanical means to cause the motor to drive the recording mechanism such as a drum or dial arrangement.

5. A neutralizing arrangement whereby the motor mechanism affects the pick up system causing the generated voltage to disappear, neutralize, or restore the electrical equilibrium.

The speed at which the indicator is moved, which also restores the electric equilibrium, and the speed at which the motor runs is dependent upon the extent to which the equilibrium is out of balance.

The apparatus consists of a system of mechanical, electronic, and electromotive means; but the actual measurement is not mechanical, electrical or electronic but depends upon maintaining a geometric figure, as these means are only devices to restore a certain given geometric configuration.

The mechanical arrangement of items 1 and 5 can be made in different ways to suit different requirements as to accuracy or other special requirements. Two ways which have been advantageously used and which come within the broad principle of the invention are herein set forth.

The items 1, 2 and 3 form a follow-up system which may be any suitable arrangement of electronic control, whereby a small change in distance, temperature, light or pressure is the primary cause of the rotation of a motor.

There are two major, mechanical objects in view:

1. To provide instrumentalities to obtain the foregoing objects without placing any extra constant load on the specimen to be tested due to the weight of the apparatus.

2. To provide mechanical means to obtain the main objects by leaving a very small permanent load on the specimen.

A necessary objective in testing was the distribution of weight in such a manner that the weight of the apparatus would have no tendency to bend thin specimens.

Another object was to make the same pick up and aligning apparatus applicable to all thicknesses without any appreciable increase in the weight of the system and for this purpose certain features of the Robert B. Lewis, U. S. Patent No. 1,531,111 have been incorporated in the embodiment shown in Figure 2 of the drawings.

Other objects of the invention will hereinafter appear in the detailed description and the appended claims.

With the foregoing in view, my invention comprehends a novel method of and apparatus for measuring and recording small distances.

Other novel steps of the method and features of construction will hereinafter clearly appear in the detailed description and the appended claims.

For the purpose of illustrating the invention, I have shown in the accompanying drawings typical embodiments of it, which, in practice, will give reliable and satisfactory results. It is, however, to be understood that these embodiments are typical only and that the various instrumentalities of which my invention consists can be variously arranged and organized, and the invention is not limited to the precise arrangement and organization of these instrumentalities as herein set forth.

Figure 1 is a front elevation partly broken away of an apparatus for measuring and recording, which can be employed in practicing my method.

Figure 2 is a top plan view of another embodiment of extensometer and pick up.

Figure 3 is a side elevation of Figure 2.

Figure 4 is a sectional detail on an enlarged scale of the movable pivot and its mounting.

Figure 5 is an exploded view, in perspective and on an enlarged scale, of the body portion of the extensometer and its adjuncts.

Figure 6 is an enlarged plan view of the clamping mechanism.

Figure 7 is a plan view of Figure 8.

Figure 8 shows mechanical connections between the pick up system, motor and dial arrangements.

Similar numerals indicate corresponding parts.

Referring to the drawings:

1 designates a test piece, the elongation or compression of which is to be measured and recorded. 2 and 3 are the holding devices of the testing machine. 4 and 5 are pointed members or knife edges of any conventional construction, such as spring action screws or any other suitable mechanism which will not interfere with the axial movement of lever arms 6 and 7. The lever 6 has fixedly connected with it a knife edge 8 resting in a pan 9, fixed to the lever 7. The pan 9 has pivot points 10 to receive the pivots of screws fixed to the fork 11 of a floating supporting bracket 12 which carries the weight of the entire sensitive system.

The bracket 12 has an arm 13 located at the general center of gravity of the floating system to which is connected one end of a cable 14, which passes over a pulley 15 mounted on pivots 16, carried by a square post 17, fixed to the rigid frame work 18 of the testing machine. The cable 14 is connected to a counterweight 19. The bracket 12 has a hub 20 freely slidable on the post 17.

A pick up arrangement is connected to the outer ends of the levers 6 and 7 and consists of a part of a sensitive unit 21 fixed to a screw 22 having a square part 23, which passes through a square hole in the lever 7, and a second part of a sensitive unit 24 fixed to the lever 6.

Considering now the screw 22, this cannot turn in the lever 7 because of the square section 23 engaging a square hole in lever 7. The screw 22 meshes with the internal threads 25 of a shaft 26 which is externally threaded as at 27 to mesh with the threaded opening 28 of the offset arm 29 of the lever 7. The threads are in the same direction.

A gear 30 is fixed to the shaft 26 and meshes with an elongated pinion 31 which is free to slide on a shaft 32 but is prevented from relative rotation thereon. As illustrated the shaft 32 is a square shaft in cross section and passes through a square hole in the gear.

The mechanical means, herein disclosed, are much simpler, less expensive and more accurate.

The shaft 32 is round at the ends to receive its bearings 33 which take up axial forces on the shaft and are mounted in any desired manner on the rigid frame of the testing machine. The upper end of the shaft 32 has a gear 34 fixed to it, said gear meshing with a gear 35 on shaft 36 journalled in bearings 37 carried by the frame of the testing machine. A recording drum 38 is fixed on the shaft 36 in a certain zero angle position by means of a set screw 39. 40 is any marking arrangement or indicator which will scribe a line on the surface of the drum when it is turned. This pen by its axial position relative to the end of the drum gives one of the coordinates of the stress-strain diagram. Part of the drum can be graduated and together with a pointer, give at all times an immediate reading of the elongation of the test specimen.

The shaft 32 at its lower end has a gear 41 fixed to it, and this gear meshes with a gear 42 on a shaft 43 journalled in bearings 44 carried in any desired manner by the testing machine frame. The shaft 43 has a compound pulley 45 fixed to it, and around this pulley an elastic belt 46 passes, said belt also passing around a compound pulley 47 on the shaft 48 of a reversible electric motor 49 suitably mounted on the testing machine frame, or any other desired location.

A compound pulley is preferably employed so that the relative speed between the motor and shaft 43 can be varied, although this is not necessary. If employed, however, it makes it easier to obtain the same degree of accuracy in charting the elongation curve on the drum no matter how fast the testing machine may be running.

The pick up arrangement is connected by conductors 50 with the input of a vacuum tube amplifier 52'. Conductors 53 connect the output of the amplifier 52 with the input of the motor controller 55 which is connected by conductors 56 with the reversible motor 49. The motor controller 55 may be any kind of a thermionic valve controlling device, using either vacuum tubes or thyratrons as grid controlled rectifiers, grid controlled resistors, grid controlled condensers or any other suitable arrangement. The pick-up system of these recorders as manufactured and sold has been an electro-magnetic coil with steel laminated case 24, a similar case 21 with an air gap separating the cases.

The control system from 24 to 49 may be similar to that shown in the Simonds Patent No 1,694,237, of December 4, 1928, or other control systems of similar characteristics.

A variable impedance can be employed similar to that of Patent No. 1,694,237, with an amplifier in the circuit.

The amplifier 52 can be similar to that shown in my pending application, Serial No. 145,194.

The lever 7 has a screw 58 fixed to it, and on this screw is a knurled nut 59. In a similar manner the lever 6 has fixed to it a screw 60 which carries a knurled nut 61. These nuts 59 and 61 serve as counterweights and provide for independently adjusting the center of gravity of the lever arms 6 and 7 so that they will balance on the knife edge and pivot points.

The levers 6 and 7 may if desired be connected by balancing springs 62 and 63.

The weight of the counterweight 19 is exactly the combined weight of the floating system including parts 4 to 13 inclusive, 20 to 31 inclusive and 58 to 61 inclusive.

In the operation of this form of my invention, we will assume that the test piece or specimen 1 is stressed in the testing machine, and therefore elongates. The points 4 and 5 open up the scissor arrangement formed by the levers 6 and 7, while at their opposite ends the levers move towards each other bringing the two halves of the pick up system nearer together. This sets up a voltage in the pick up system which consists of a balanced A. C. network of constant frequency but unbalanced by the relative movement of levers 6 and 7. This unbalanced voltage is conducted to the amplifier 52. The amplified voltage is conducted to the motor controller 54 which sets up a voltage and current through the motor 49 which will start running in a direction indicative of elongation in the specimen. The motor continues to run as long as voltage is present. The motor through the belt and pulley arrangement drives shaft 43, gears 42 and 41, shaft 32 and gears 31 and 30 which will move shaft 26, screw 22 and unit 21 until the initial geometric relative position of units 21 and 24 is restored within very close limits. The primary voltage was caused by a change in this relative position and the voltage will now disappear when the geometrical relations are restored. By geometrical relation, I mean the parts are restored substantially to their initial or starting position from which they have been moved.

As the shaft 32 revolves, the gears 34 and 35 will be driven to revolve the drum 38. The angle which the drum turns has a definite relation to the elongations of the test specimen.

If the test specimen had been compressed the same action as explained would take place but in a reverse direction.

This method is suitable for taking both compression and elongation curves and can be used to take up directly mechanical hysteresis curves and also curves for the endurance and fatigue of a test piece, subjected to alternate compression and tension strains.

In this system the lost motion is so small that it can be disregarded.

The lost motion in parts 4 and 5 can be made practically zero. The same holds true of knife edge 8, pan 9 and pivot points 10. The levers 6 and 7 are of ample cross sectional area so that no bending will occur.

The only lost motion will be that between gears 30 and 31 and 34 and 35 but as these are on the same side they will cancel out and will not show on the graph, provided they are practically equal and the motor has sufficient speed to take up fast enough back lash in mechanical movement. The latter is one of the requirements to the motor circuit and arrangement.

Instead of using two screws 22 and 26 only one can be employed. Two screws give the same effect as one with a very fine thread.

If screw shaft 26 has $n_1$ external threads per inch and $n_2$ internal threads per inch, one turn of the shaft 26 will move part 21 an axial distance as shown in the following equation where $d$ equals the distance.

$$d = \frac{1''}{n_1} - \frac{1''}{n_2} = \frac{n_2 - n_1}{n_1 . n_2} 1''$$

This screw arrangement provides certain advantages for the engineering of the apparatus.

In Figures 2 and 3, I have illustrated another embodiment of the invention which can be advantageously employed in carrying out my invention. In this embodiment 63 designates the body portion of an extensometer attachable to a test specimen to determine its change in length when subjected to a deforming stress tending to elongate or shorten the test specimen. The body portion has extending spaced dovetails 64, slotted at 65 to receive fastening devices 66 which secure a bar 67 in adjusted position on the dovetails, the bar being slotted at 68 to receive the dovetails. 69 designates an angle plate having openings 70 to receive the dovetails. The bar 71 has pins encircled by springs 72 and extending into the angle plate. 73 is a nut carrying limiting pin. The angle plate 69 and body portion 63 form a U shaped frame to carry the moving parts. The bar 67 has bearing lugs 74 for a hook-shaped lever 75 which is recessed at 76 to receive a lug 77 on the angle plate. A spring 78 between the free end of the lever 75 and an arm 79 on the angle plate tends to retain the hook in locked position. The angle plate 69 has fixed to it a knife edge 80. The body portion 63 carries a knife edge bearing 81 to receive the knife edge 82 of a lever 83. The arms of a lever 84 are fulcrumed at 85 on the lever 83 and the lower ends of these arms form a support for a sensitive unit 86 which cooperates with a sensitive unit 87 on the lever 83. 88 is a plate spring fixed to the angle plate and 89 is a plate spring fixed to the body portion. The body portion carries a bracket 90 to receive a pivot pin 91 of a bell crank 92. The lever 84 has a pin 93 against which bears a ball 94 carried by an arm of the bell crank a predetermined distance from the center line of its pivot, and a spring 95 maintains contact between the ball and the pin. A ball 96 in the other arm of the bell crank bears against a micrometer screw 97 engaging a nut 98 fixed to the body portion. The screw 97 has a pin and slot connection with a shaft 99 to form a universal joint with no lost motion in it.

The shaft 99, see Figures 7 and 8, is supported in bearings 101, preferably ball bearings carried by the support 102. The shaft 99 has a spiral gear 103 which meshes with a spiral gear 104 slidable on a square shaft 105 journalled in bearings 106 on the machine frame. A gear 107 on the shaft 105 is adapted to mesh with the gear 42, Figure 1. The support 102 is adjustable on a standard 108 and may be fixed in position by a fastening device 109 or counterbalanced by a counterweighted cable 110 corresponding to 14 in Figure 1.

Comparing Figures 7 and 8 with Figure 1, it will be seen that 108 corresponds to 17, 105 to 32, 104 to 31 and 103 to 30. The differential screw arrangement of Figure 1 is not used in Figures 7 and 8 but can be used if warranted by the desired magnification.

The principle is the same as in Figure 1. The difference is that gear 103 is not fixed directly to the screw as 30 on 26 in Figure 1 but I use a universal joint on shaft 99. The drive from motor 49 to gear 107 is the same as the drive from 49 to gear 41 in Figure 1.

The center line on which the pivots of 83 and 84 turn are the same.

If lever 83 is moved an angle $+\alpha$ and 84 is moved an angle $+\alpha$ their relative position and the total geometrical configuration of parts rigidly attached to them will be the same as it was before any of them were moved.

In the operation of this form of my invention the extensometer is clamped to the specimen which is to be subjected to stress to vary its length. Assuming that the specimen elongates, lever 83 rocks on pivot 81 changing the relative position of the sensitive unit and a voltage is generated in the pick up system, which passes to the amplifier 52, see Figure 1, to the motor control 55 and motor 49. Motor 49 drives shaft 105 corresponding to 32 in Figure 1 and the measuring and recording device as in Figure 1.

The shaft 99 drives micrometer screw 97 thereby bell crank 92 which moves lever 84 to restore the original relation and configuration between the sensitive units.

The recording mechanism has been shown for the purpose of illustration as a revoluble drum coacting with a marker, controlled by some other mechanism. This relationship may be reversed.

It will now be apparent that I have devised a new and useful method of and apparatus for measuring and indicating or automatically recording small distances which embody the features of advantage enumerated as desirable in the statement of the invention and the above description, and while I have, in the present instance, shown and described preferred embodiments thereof, which will give in practice satisfactory and reliable results, it is to be understood that these embodiments are susceptible to modification in various particulars without departing from the spirit or scope of the invention or sacrificing any of its advantages.

Having thus described my invention what I claim as new and desire to secure by Letters Patent is:

1. An apparatus for determining changes in distance of a test piece, comprising members having a counterbalanced floating fulcrum and connected with the test piece, a sensitive unit having a part on each member to provide a voltage on relative movement of said members, and a reversible electric motor controlled by said voltage and operatively connected with one of said members to restore the initial geometric relation of said sensitive unit.

2. An apparatus for determining changes in distance of a test piece, comprising members having a counterbalanced floating fulcrum and connected with the test piece, a sensitive unit having a part on each member to provide a voltage on relative movement of said members, a reversible electric motor controlled by said voltage and operatively connected with one of said members to restore the initial geometric relation of said sensitive unit and recording means driven by the operative connection between said motor and its member.

3. An apparatus for determining changes in distance of a test piece, comprising members having a counterbalanced floating fulcrum and connected with the test piece, a sensitive unit having a part on each member to provide a voltage on relative movement of said members, a reversible electric motor controlled by said voltage and operatively connected with one of said members to restore the initial geometric relation of said sensitive unit, and an adjustable counterbalance for each member.

4. An apparatus for determining changes in distance of a test piece, comprising members having a counterbalanced floating fulcrum, a pick-up having a part on each member to provide a voltage on relative movement of said members, and a reversible electric motor in circuit with one part of said pick-up to be controlled thereby, and mechanically connected with the member which carries the other part to restore the initial geometric relation of said parts.

5. An apparatus for determining changes in distance of a test piece, comprising a post, a bracket movable thereon, members fulcrumed on said bracket and connected with the test piece, a pick-up having a part on each member cooperating to provide a voltage on relative movement of said members, a longitudinally adjustable connection on one of said members, a reversible electric motor in circuit with said pick-up to be controlled by its voltage and mechanically connected with said adjustable connection to restore the initial geometric relation of said pick-up parts, and a counterbalance for said bracket, members, pick-up and adjustable connection.

6. An apparatus for determining changes in distance of a test piece, comprising a counterbalanced bracket movably supported, members fulcrumed on said bracket and connected with the test piece, a pick-up having parts connected with said members to provide a voltage on their relative movement, a variable connection on one member having a gear, a second gear on said bracket meshing with the first gear, and a reversible motor in circuit with said pick-up and controlled by its voltage and mechanically connected with said second gear to restore the initial geometric relation of said pick-up parts.

7. An apparatus for determining changes in distance of a test piece, comprising members having a counterbalanced floating fulcrum and connected with the test piece, a sensitive unit having a part on each member to provide a voltage on relative movement of said members, and an electric motor controlled by said voltage and operatively connected with one of said members to restore the initial geometric relation of said sensitive unit.

JENS SIVERTSEN.